J. T. McGUIRE.
PNEUMATIC TIRE GAITER.
APPLICATION FILED MAR. 3, 1915.
1,137,876.
Patented May 4, 1915.
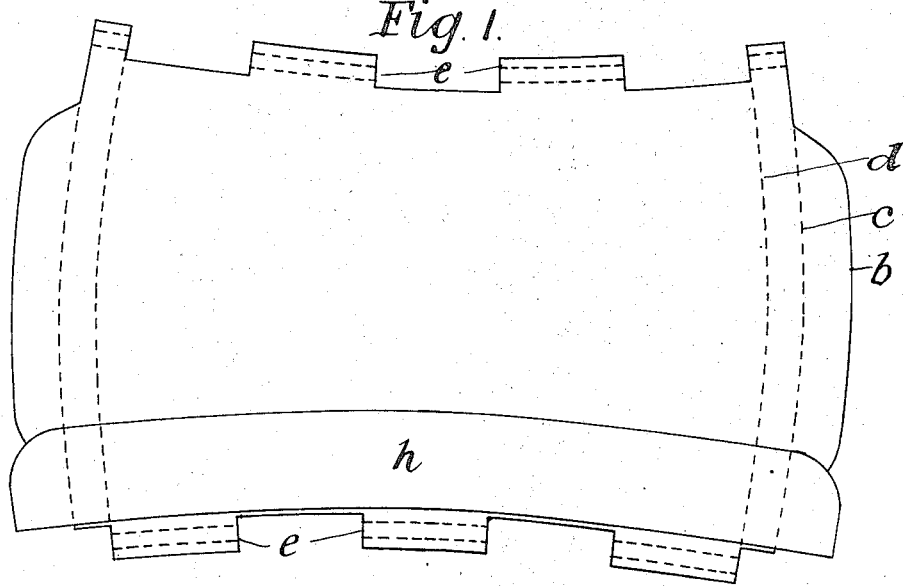
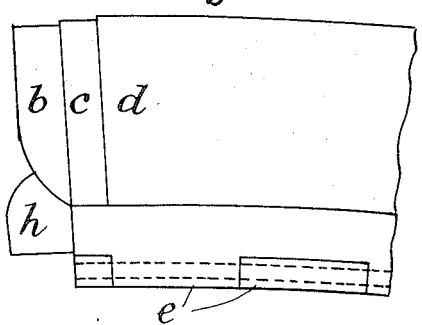
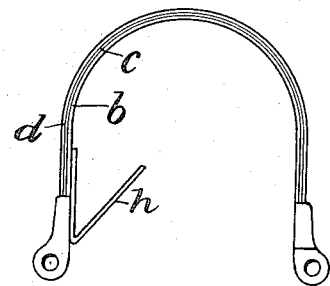
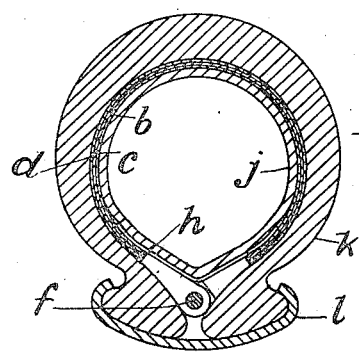
Witnesses
Inventor
Joseph Taylor McGuire
by
Attorney

UNITED STATES PATENT OFFICE.

JOSEPH TAYLOR McGUIRE, OF NEWCASTLE-UPON-TYNE, ENGLAND.

PNEUMATIC-TIRE GAITER.

1,137,876.  Specification of Letters Patent.  Patented May 4, 1915.

Application filed March 3, 1915. Serial No. 11,826.

*To all whom it may concern:*

Be it known that I, JOSEPH TAYLOR MCGUIRE, a subject of the King of England, residing at Newcastle-upon-Tyne, in England, have invented certain new and useful Improvements in Pneumatic-Tire Gaiters, of which the following is a specification.

This invention relates to improvements in pneumatic tire gaiters and consists of a strap or gaiter which can be readily placed and fastened around the air tube of the tire when the latter is deflated and can be moved to any part of the tire to protect the inner tube from the results of a burst or damaged part of the outer covering and to prevent expansion of the air tube against the burst, thus enabling the tire to continue in use. The gaiter is provided with fastening means comprising male and female hinge parts adapted to be connected together by means of a removable pin.

The annexed drawings illustrate the invention.

Figure 1 shows the gaiter or strap opened out. Fig. 2 is a part side elevation, and Fig. 3 an end elevation of the gaiter or strap with the hinge pin withdrawn. Fig. 4 is a section of the complete tire with strap in place.

The strap is shaped to the contour of the interior of the cover and made of two or more layers of canvas, or fabric molded together, and is provided on the edges with projections in the form of male and female hinge members made of similar materials to that of the beads of the cover of the tire. The inner layer $b$ of the strap is cut on the cross, so that its projecting ends are extensible to fit easily against the tire cover, the other two layers $c$ $d$, shown on the drawings, are shorter than $b$ and cut on the straight, and are not extensible.

$e$ indicates the male and female hinge members, $f$ is the hinge pin which is bent to the contour of the rim.

$h$ is a flap fixed on the strap. This flap is to prevent the air tube $j$ coming in contact with the hinge, and is made a little longer than the strap as shown in Fig. 2.

$k$ is the outer cover and $l$ the rim.

What I claim as my invention and desire to secure by Letters Patent of the United States is:—

In a tire repair device, a plurality of superposed layers of fabric, the innermost of said layers being cut on the bias and the remaining layers being cut on the straight, said innermost layer extending lengthwise beyond the remaining layers and all of said layers being molded together and shaped to the contour of the tire; and means on the longitudinal edges of said molded together layers for securing the strap in place.

In witness whereof I have signed this specification in the presence of two witnesses.

JOSEPH TAYLOR McGUIRE.

Witnesses:
T. J. WATSON,
C. S. GARDNER.